US012446577B2

(12) United States Patent
De Saegher et al.

(10) Patent No.: US 12,446,577 B2
(45) Date of Patent: Oct. 21, 2025

(54) COMPOSITION COMPRISING A CHOLINE SALT OF A FATTY ACID AND ITS USE AS A FUNGICIDE

(71) Applicant: BIPA NV, Londerzeel (BE)

(72) Inventors: Johan De Saegher, Destelbergen (BE); Son Nguyen Huu, Ghent (BE); Andrea Nesler, Pergine Valsugana (IT); Ann Vermaete, Hamme (BE); Sandro Frati, Antwerp (BE)

(73) Assignee: BIPA NV, Londerzeel (BE)

( * ) Notice: Subject to any disclaimer, the term of this patent is extended or adjusted under 35 U.S.C. 154(b) by 663 days.

(21) Appl. No.: 17/296,073

(22) PCT Filed: Nov. 22, 2019

(86) PCT No.: PCT/EP2019/082210

§ 371 (c)(1),
(2) Date: May 21, 2021

(87) PCT Pub. No.: WO2020/104645

PCT Pub. Date: May 28, 2020

(65) Prior Publication Data

US 2022/0030859 A1 Feb. 3, 2022

(30) Foreign Application Priority Data

Nov. 23, 2018 (BE) .................................. 2018/5821

(51) Int. Cl.
*A01N 37/02* (2006.01)
*A01N 33/12* (2006.01)
*A01P 3/00* (2006.01)

(52) U.S. Cl.
CPC ............. *A01N 37/02* (2013.01); *A01N 33/12* (2013.01); *A01P 3/00* (2021.08)

(58) Field of Classification Search
CPC ............ A01N 37/02; A01N 33/12; A01P 3/00
See application file for complete search history.

(56) References Cited

U.S. PATENT DOCUMENTS 5,093,124 A 3/1992 Kulenkampff
6,103,768 A * 8/2000 Savage ................ A01N 43/653
514/483

FOREIGN PATENT DOCUMENTS

CN 1069391 A 3/1993
WO WO 1994/000982 A1 1/1994
WO WO 2003/059063 A1 7/2003
WO WO-03059063 A1 * 7/2003 ............. A01N 37/02
WO WO 2014/128009 A1 8/2014

OTHER PUBLICATIONS

Petkovic, Marija & Ferguson, Jamie & Gunaratne, H. & Ferreira, Rui & Leitão, Maria & Seddon, Kenneth & Luís, Paulo & Rebelo, L.P.N. & Silva Pereira, Cristina. (2010). Novel biocompatible cholinium-based ionic liquids—Toxicity and biodegradability. Green Chemistry. 12. 643-649. 10.1039/b922247b. (Year: 2010).*
Chadeganipour et al., Antifungal activities of pelargonic and capric acid on Microsporum gypseum, Mycoses, vol. 44, No. 3-4, pp. 109-112, 2001.
Klein et al., Biodegradability and cytotoxicity of choline soaps on human cell lines: effects of chain length and the cation, RSC Advances, vol. 3, No. 45, p. 23347, 2013.
Muhammad et al., Synthesis and Physical Properties of Choline Carboxylate Ionic Liquids, Journal of Chemical and Engineering Data, vol. 57, No. 8, pp. 2191-2196, 2012.
Pernak et al., Bioherbicidal Ionic Liquids, ACS Sustainable Chemistry & Engineering, vol. 6, pp. 2741-2750, 2017.
Petkovic et al., Novel biocompatible cholinium-based ionic liquids-toxicity and biodegradability, Green Chemistry, vol. 12, No. 4, p. 643, 2010.
International Search Report and Written Opinion mailed on Jan. 29, 2020 in International Application No. PCT/EP2019/082210.
Written Opinion mailed on Oct. 16, 2020 in International Application No. PCT/EP2019/082210.
International Preliminary Report On Patentability mailed on Feb. 25, 2021 in International Application No. PCT/EP2019/082210.
Pawłowska et al., Phytotoxicity of ionic liquids, Chemosphere, vol. 237, 2019, 124436, https://doi.org/10.1016/j.chemosphere.2019.124436.
Montanari, S., et al., The sustainable fungicide choline pelargonate inhibits *Botrytis cinerea* and *Phytophthora infestans* growth by altering membrane structure and lipid content, Pesticide Biochemistry and Physiology, 213, 106471, 2025, 11 pages.

* cited by examiner

*Primary Examiner* — Danah Al-Awadi
*Assistant Examiner* — Chantal Adlam
(74) *Attorney, Agent, or Firm* — Knobbe, Martens, Olson & Bear, LLP

(57) ABSTRACT

A method for controlling or preventing a fungal infection on a plant or plant part involves applying a composition that has a choline salt of a C8-C10 fatty acid to the plant, plant part, or locus of growth of the plant. The composition can be used as a fungicide on a plant or plant part. An example of a C8-C10 fatty acid in the composition is choline pelargonate.

7 Claims, 1 Drawing Sheet

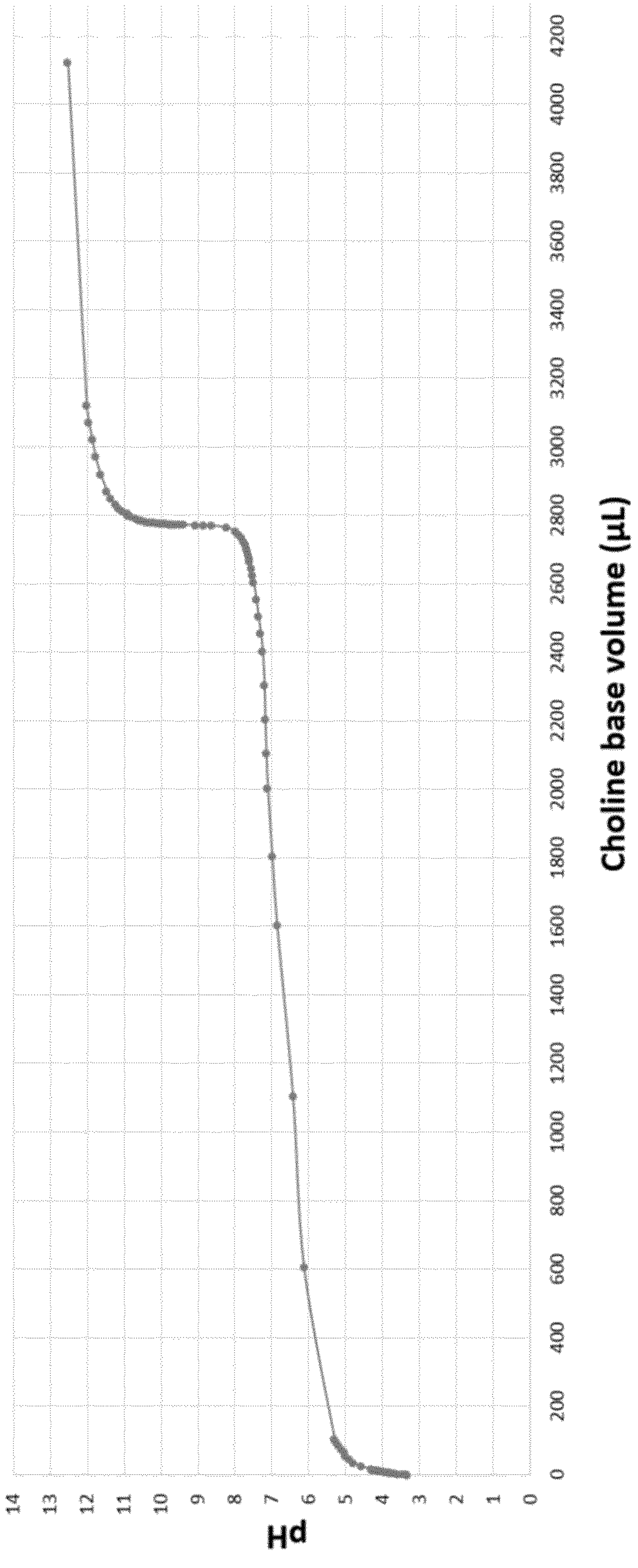
pH
0
1
2
3
4
5
6
7
8
9
10
11
12
13
14
Choline base volume (µL)
0
200
400
600
800
1000
1200
1400
1600
1800
2000
2200
2400
2600
2800
3000
3200
3400
3600
3800
4000
4200

COMPOSITION COMPRISING A CHOLINE SALT OF A FATTY ACID AND ITS USE AS A FUNGICIDE

PRIORITY AND CROSS REFERENCE TO RELATED APPLICATIONS

This application is the U.S. National Stage Application under 35 U.S.C. § 371 of International Application No. PCT/EP2019/082210, filed Nov. 22, 2019, designating the U.S. and published in the English language as WO 2020/104645 A1 on May 28, 2020, which claims the benefit of Belgium Patent Application No. BE 2018/5821, filed Nov. 23, 2018. Any and all applications for which a foreign or a domestic priority is claimed is/are identified in the Application Data Sheet filed herewith and is/are hereby incorporated by reference in their entirety under 37 C.F.R. § 1.57.

FIELD OF THE INVENTION

The present invention is situated in the agricultural and horticultural field, in particular in the field of crop protection. In particular, the invention relates to environmentally friendly methods and uses for controlling fungi on plants or plant parts.

BACKGROUND OF THE INVENTION

In order to reduce the loss and maintain the quality of agricultural and horticultural crops, many chemicals are used for control of crop diseases. However, the use of pest and disease control chemicals during crop production often leads to the presence of chemical residues in the crop after harvest. In particular, higher dosages and repeated applications of conventional formulations result in the accumulation of residues in vegetal commodities along with environmental pollution. In addition to the contamination of the crops, plants and the environment, the toxicity of the chemical compound to humans and/or animal is also a concern when using pest and disease control chemicals. In this context, producing crops in a sustainable manner is of increasing importance in agriculture. This requires safer and environmentally friendly formulations and methods for controlling plant fungi and other plant diseases and plant pests.

Accordingly, there remains a need in the art for further and/or improved methods for controlling fungi and/or pests on plants or plant parts.

Several fatty acids, such as caprylic acid (C8:0 fatty acid), pelargonic acid (C9:0 fatty acid) and capric acid (C10:0 fatty acid), have herbicidal properties. In particular, pelargonic acid is a naturally occurring, saturated, nine-carbon fatty acid (C9:0) and occurs widely in nature. Its toxicity to mammals and birds is low. It has been described as a broad-spectrum contact herbicide in plants. Pelargonic acid is used to prevent growth of weeds and as a blossom thinner. Pelargonic acid was originally discovered in *Pelargonium graveolens*. The mode of action of pelargonic acid involves its intercalation into cells of the epidermis, desiccation of the foliage, and cell damage. A similar mode of action has been proposed for caprylic and capric acid.

SUMMARY OF THE INVENTION

The inventors of the present application have found that fatty acids, particularly C8-C10 fatty acids, such as caprylic acid, pelargonic acid or capric acid, can be used as a fungicide on plants with strongly reduced or even without phytotoxic effects when formulated as the choline salt of the fatty acid, such as when formulated as choline caprylate, choline pelargonate or choline caprate, despite the commonly known use of such fatty acids, in particular caprylic acid, pelargonic acid capric acid, as a herbicide. Advantageously, the present composition comprising the choline salt of C8-C10 fatty acids, particularly comprising choline caprylate, choline pelargonate and/or choline caprate, more specifically comprising choline pelargonate, can be used as a fungicide by applying (e.g. spraying) the composition in an amount effective to inhibit the growth of one or more phytopathogenic fungi on plants or parts thereof without phytotoxicity to the plants or parts thereof. Furthermore, the present composition is environmentally friendly and not expected to have any unacceptable adverse effects on humans, non-target organisms or the environment. The present composition decomposes rapidly in both land and water environments, so it does not accumulate into the environment.

Accordingly, a first aspect of the invention relates to the use of a composition comprising the choline salt of one or more C8-C10 fatty acids as a fungicide on a plant or plant part. The present composition has satisfactory or even high fungicidal activity on a plant or part thereof, and at the same time shows reduced or no phytotoxicity on the plant or part thereof.

A more particular aspect of the invention relates to the use of a composition comprising choline caprylate, choline pelargonate and/or choline caprate as a fungicide on a plant or plant part. An even more particular aspect of the invention relates to the use of a composition comprising choline pelargonate as a fungicide on a plant or plant part. In particular embodiments, said composition comprising the choline salt of one or more C8-C10 fatty acids, such as choline caprylate, choline pelargonate and/or choline caprate, preferably choline pelargonate, is an aqueous composition comprising the respective fatty acid choline salt. In particular embodiments said composition comprising the one or more fatty acid choline salt is formulated as a spray or sprayable liquid, or a concentrate.

In particular embodiments, said composition comprising a C8-C10 fatty acid choline salt, such as choline caprylate, choline pelargonate and/or choline caprate, preferably choline pelargonate, is an aqueous composition comprising between 0.00001% (w/v) and 70% (w/v) of the C8-C10 fatty acid choline salt, such as choline caprylate, choline pelargonate and/or choline caprate, preferably choline pelargonate. For instance, the composition comprising a C8-C10 fatty acid choline salt may be an aqueous composition comprising between 0.0001% (w/v) and 70% (w/v), between 0.001% (w/v) and 65% (w/v), between 0.01% (w/v) and 60% (w/v), between 0.05% (w/v) and 55% (w/v), or between 0.1% (w/v) and 50% (w/v) of the C8-C10 fatty acid choline salt.

In particular embodiments, said composition comprising a C8-C10 fatty acid choline salt, such as choline caprylate, choline pelargonate and/or choline caprate, preferably choline pelargonate, is a solid or powdered composition comprising at least 70% (w/w), at least 80% (w/w) or at least 90% (w/w/) or up to 100% (w/w) of the C8-C10 fatty acid choline salt, such as choline caprylate, choline pelargonate and/or choline caprate, preferably choline pelargonate.

In certain embodiments, said composition is a concentrate, particularly an aqueous concentrate, comprising between 5% (w/v) and 70% (w/v) of the C8-C10 fatty acid choline salt, such as choline caprylate, choline pelargonate and/or choline caprate, preferably choline pelargonate, preferably between 10% (w/v) and 60% (w/v) of the C8-C10 fatty acid choline salt.

In certain embodiments, the composition is a sprayable liquid comprising between 0.00001% (w/v) (or 0.1 ppm) and 5% (w/v) of the C8-C10 fatty acid choline salt, preferably choline caprylate, choline pelargonate and/or choline caprate, more preferably choline pelargonate, preferably between 0.05% (w/v) and 2% (w/v) of the C8-C10 fatty acid choline salt, such as choline caprylate, choline pelargonate and/or choline caprate, preferably choline pelargonate. For instance, the composition may be a sprayable liquid comprising between 0.0001% (w/v) (or 1 ppm) and 5% (w/v), between 0.001% (w/v) (or 10 ppm) and 5% (w/v), between 0.01% (w/v) and 5% (w/v), between 0.05% (w/v) and 2% (w/v), or between 0.1% (w/v) and 1% (w/v) of the C8-C10 fatty acid choline salt.

In particular embodiments, the composition comprising a C8-C10 fatty acid choline salt, such as choline caprylate, choline pelargonate and/or choline caprate, preferably choline pelargonate, further comprises at least one further additive and/or auxiliary agent, such as a solvent, a carrier, a surfactant, an antifreeze agent, a thickener, a buffering agent, an antifoaming agent, an antioxidant, a preservative or a colorants.

A related aspect of the invention relates to a method for controlling fungi on a plant or plant part, the method comprising applying a composition comprising a C8-C10 fatty acid choline salt, such as a choline caprylate, choline pelargonate and/or choline caprate, preferably choline pelargonate, particularly an aqueous composition comprising a C8-C10 fatty acid choline salt, to the plant, plant part, or the locus of growth of the plant. The present composition advantageously has satisfactory or even high fungicidal activity when applied on a plant or part thereof, while at the same time showing reduced or no phytotoxicity on the plant or part thereof.

In particular embodiments, said fungi is a pathogenic fungus selected from the group consisting of *Colletotrichum, Botrytis, Alternaria, Fusarium, Rhizoctonia, Sclerotinia, Verticillium, Pythium, Phytophtora, Puccinia*, Erysiphales (incl. powdery mildew) and Peronosporaceae (incl. downy mildew), *Thielaviopsis* spp, *Magnaporthe grisea; Armillaria* spp, *Ustilago* spp., *Phakospora pachyrhizi, Guignardia bidwellii, Blumeria graminis, Mychosphaerella* spp., *Venturia* spp., *Monilinia* spp.; preferably wherein the fungus is *Colletotrichum coccodes, Botrytis cinerea, Alternaria solani*, or *Fusarium graminearum.*

In particular embodiments, the plant or plant part is an agricultural or horticultural crop.

In particular embodiments, said method comprises applying, preferably spraying, a composition comprising between 0.00001% (w/v) and 5% (w/v) of a C8-C10 fatty acid choline salt, such as choline caprylate, choline pelargonate and/or choline caprate, preferably choline pelargonate, to the plant, plant part, or locus of growth of the plant. For instance, the method may comprise applying, preferably spraying, a composition comprising between 0.0001% (w/v) and 5% (w/v), between 0.001% (w/v) and 5% (w/v), between 0.01% (w/v) and 5% (w/v), between 0.05% (w/v) and 2% (w/v), or between 0.1% (w/v) and 1% (w/v) of a C8-C10 fatty acid choline salt to the plant, plant part, or locus of growth of the plant.

In particular embodiments, the composition comprising a C8-C10 fatty acid choline salt, such as choline caprylate, choline pelargonate and/or choline caprate, preferably choline pelargonate may be sprayed on the plant, plant part, or locus of growth of the plant.

A further aspect relates to a method for producing a composition comprising a C8-C10 fatty acid choline salt, such as choline caprylate, choline pelargonate and/or choline caprate, preferably choline pelargonate, comprising mixing a C8-C10 fatty acid, preferably pelargonic acid, with water, thereby obtaining a solution of the respective fatty acid; and mixing the solution comprising a C8-C10 fatty acid, preferably pelargonic acid, with choline hydroxide, to obtain a composition comprising a C8-C10 fatty acid choline salt (e.g. choline caprylate, choline pelargonate and/or choline caprate), preferably choline pelargonate. The present method advantageously avoids gel formation which occurs upon mixing a C8-C10 fatty acid with choline.

In particular embodiments, the fatty acid and choline hydroxide are mixed in a ratio of 2:1 to 1:2, preferably in a ratio of 1.5:1 to 1:1.5, more preferably in equimolar ratios. In certain embodiments, the method further comprises mixing the composition comprising a C8-C10 fatty acid choline salt, such as choline caprylate, choline pelargonate and/or choline caprate, preferably choline pelargonate, with at least one of an auxiliary, a solvent, a carrier, a surfactant or an extender. In particular embodiments, said method further comprises the step of diluting the composition comprising a C8-C10 fatty acid choline salt, such as choline caprylate, choline pelargonate and/or choline caprate, preferably choline pelargonate prior to application, particular diluting at a ratio of 1:2 to 1:10000000 (i.e. $10^7$), for instance at a ratio of at a ratio of 1:2 to 1:1000000 (i.e. $10^6$), 1:2 to 1:100000, 1:4 to 1:10000, 1:5 to 1:1000, or 1:10 to 1:500, preferably at a ratio of 1:5 to 1:250. In particular embodiments, said method further comprises the step of dissolving a solid composition comprising a C8-C10 fatty acid choline salt, such as choline caprylate, choline pelargonate and/or choline caprate, preferably choline pelargonate, preferably a solid or powdered composition comprising at least 70% (w/w), at least 80% (w/w) or at least 90% (w/w/) or up to 100% (w/w) of a C8-C10 fatty acid choline salt, such as choline caprylate, choline pelargonate and/or choline caprate, preferably choline pelargonate, in an aqueous solution prior to application.

Those skilled in the art will recognize the many other effects and advantages of the present products, methods or uses, and the numerous possibilities for end uses (e.g., farmers) of the present invention from the detailed description and examples provided below.

BRIEF DESCRIPTION OF THE DRAWINGS

FIG. 1 represents a graph illustrating the titration curve of 2 mL pelargonic acid (>97%) in 48 mL distilled water with choline hydroxide (45%).

DETAILED DESCRIPTION

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms also encompass "consisting of" and "consisting essentially of", which enjoy well-established meanings in patent terminology.

The recitation of numerical ranges by endpoints includes all numbers and fractions subsumed within the respective ranges, as well as the recited endpoints.

The terms "about" or "approximately" as used herein when referring to a measurable value such as a parameter, an amount, a temporal duration, and the like, are meant to encompass variations of and from the specified value, such as variations of ±10% or less, preferably ±5% or less, more preferably ±1% or less, and still more preferably ±0.1% or less of and from the specified value, insofar such variations are appropriate to perform in the disclosed invention. It is to be understood that the value to which the modifier "about" refers is itself also specifically, and preferably, disclosed.

Whereas the terms "one or more" or "at least one", such as one or more members or at least one member of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members. In another example, "one or more" or "at least one" may refer to 1, 2, 3, 4, 5, 6, 7 or more.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the invention. When specific terms are defined in connection with a particular aspect of the invention or a particular embodiment of the invention, such connotation is meant to apply throughout this specification, i.e., also in the context of other aspects or embodiments of the invention, unless otherwise defined.

In the following passages, different aspects or embodiments of the invention are defined in more detail. Each aspect or embodiment so defined may be combined with any other aspect(s) or embodiment(s) unless clearly indicated to the contrary. In particular, any feature indicated as being preferred or advantageous may be combined with any other feature or features indicated as being preferred or advantageous.

Reference throughout this specification to "one embodiment", "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

The present investors unexpectedly found that pelargonic acid, a known herbicide, can be used as a fungicide on plants without phytotoxic effects when formulated as choline pelargonate, particularly when applied in an amount effective to inhibit the growth of one or more phytopathogenic fungi.

A first aspect of the present invention thus relates to the use of a composition comprising the choline salt of one or more C8-C10 fatty acids as a fungicide. A more particular aspect of the invention relates to the use of a composition comprising choline caprylate, choline pelargonate and/or choline caprate as a fungicide. An even more particular aspect of the invention relates to the use of a composition comprising choline pelargonate as a fungicide.

In general, "fungicidal" means the ability of a substance to increase mortality or inhibit the growth rate of fungi. A further aspect relates to a method for controlling or preventing a fungal infection on a plant or plant part, the method comprising applying a composition comprising a C8-C10 fatty acid choline salt, e.g. choline caprylate, choline pelargonate and/or choline caprate, preferably choline pelargonate to the plant, plant part, or locus of growth of the plant and/or the locus of the infection on said plant, in an amount effective to inhibit the growth of one or more phytopathogenic fungi on said plant or plant part. Further aspects relate to antifungal compositions comprising the choline salt of a C8-C10 fatty acid, preferably choline pelargonate, and to methods for producing said antifungal compositions.

The term "a C8-C10 fatty acid" as used herein refers to a carboxylic acid of the structure $C_nH_{2n+1}COOH$, with n=7, 8, or 9. In preferred embodiments of the present invention, the C8-C10 fatty acid is caprylic acid, pelargonic acid or capric acid. In more preferred embodiments of the present invention, the C8-C10 fatty acid is pelargonic acid.

"Pelargonic acid" as used herein can also be referred to as "nonanoic acid" or "1-octanecarboxylic acid" or a C9 fatty acid, and refers to an organic compound composed of a nine-carbon chain terminating in a carboxylic acid functional group. Similarly, the terms "caprylic acid" and "capric acid" as used herein can also be referred to as "octanoic acid" and "decanoic acid", respectively, or a C8 fatty acid and C10 fatty acid, respectively.

The terms "choline pelargonate", "choline nonanoate" or "trimethylethanolamine pelargonate" can be used interchangeably. Likewise, the terms "choline caprylate", "choline octanoate" or "trimethylethanolamine caprylate" can be used interchangeably. Also the terms "choline caprate", "choline decanoate" or "trimethylethanolamine caprate" can be used interchangeably. The choline salt of a C8-C10 fatty acid, such as choline caprylate, choline pelargonate or choline caprate, is not known to cause unacceptable adverse ecological effects when applied as described herein. It may thus be used safely without significantly compromising the quality and yield of the plant or plant parts, or of the resultant products or crops. At the concentrations described herein, the choline salt of a C8-C10 fatty acid appears to have no unacceptable toxic and non-hazardous effects on humans, non-target organisms or the environment; for instance when sprayed on the plant.

The terms "composition" or "formulation" may be used interchangeably herein and refer to a mixture comprising an active ingredient.

The terms "active ingredient" or "active component" can be used interchangeably and broadly refer to a compound or substance which, when provided in an effective amount, achieves a desired outcome. Typically, an active ingredient may achieve such outcome(s) through interacting with and/or modulating living cells or organisms.

The present application provides an antifungal composition comprising a choline salt of a C8-C10 fatty acid as the active compound, preferably an aqueous composition comprising a choline salt of a C8-C10 fatty acid. Typically, the composition comprising a choline salt of a C8-C10 fatty acid is a liquid or aqueous composition comprising between 0.00001% (w/v) to 70% (w/v) of a choline salt of a C8-C10 fatty acid. For instance, the composition comprising a choline salt of a C8-C10 fatty acid is a liquid or aqueous composition comprising between 0.0001% (w/v) and 70% (w/v), between 0.001% (w/v) and 65% (w/v), between 0.01% (w/v) and 60% (w/v), between 0.05% (w/v) and 55% (w/v), or between 0.1% (w/v) and 50% (w/v) of a choline salt of a C8-C10 fatty acid.

The composition comprising a choline salt of a C8-C10 fatty acid may also comprise at least 70% (w/w), at least 80% (w/w) or at least 90% (w/w/) or up to 100% (w/w) of a choline salt of a C8-C10 fatty acid, particularly when formulated as a solid or powder composition. In particular embodiments, said choline salt of a C8-C10 fatty acid is choline caprylate, choline pelargonate or choline caprate. In more particular embodiments, said choline salt of a C8-C10 fatty acid is choline pelargonate.

The compositions according to the invention do not only comprise ready-to-use compositions which can be applied with suitable apparatus to the plant, but also concentrates or concentrated formulations which have to be diluted with water prior to use.

In certain embodiments, said composition may be formulated in a ready-to-use format, such as a spray or sprayable liquid, or a dip, comprising a non-phytotoxic amount of a choline salt of a C8-C10 fatty acid which, upon administration to a plant or plant part, is effective to inhibit the growth of one or more phytopathogenic fungi on a plant or plant part. In certain embodiments, the composition is a sprayable liquid or a dip, particularly an aqueous composition, comprising between 0.00001% (w/v) and 5% (w/v) of a choline salt of a C8-C10 fatty acid preferably between 0.02% (w/v) and 2.5% (w/v) of a choline salt of a C8-C10 fatty acid, more preferably between 0.05% (w/v) and 2% (w/v) of a choline salt of a C8-C10 fatty acid, such as between 0.06% (w/v) and 1.25% (w/v) of a choline salt of a C8-C10 fatty acid. For instance, the composition is a sprayable liquid or a dip, particularly an aqueous composition, comprising between 0.0001% (w/v) and 5% (w/v), between 0.001% (w/v) and 5% (w/v), between 0.01% (w/v) and 5% (w/v), between 0.05% (w/v) and 2% (w/v), or between 0.1% (w/v) and 1% (w/v) of a choline salt of a C8-C10 fatty acid.

In particular embodiments, said choline salt of a C8-C10 fatty acid is choline caprylate, choline pelargonate or choline caprate. In more particular embodiments, said choline salt of a C8-C10 fatty acid is choline pelargonate. In certain embodiments, said composition comprising a choline salt of a C8-C10 fatty acid is a concentrate, particularly comprising between 5% (w/v) and 70% (w/v) or between 10% (w/v) and 60% (w/v) of a choline salt of a C8-C10 fatty acid, preferably between 10% (w/v) and 50% (w/v) of a choline salt of a C8-C10 fatty acid, more preferably between 25% (w/v) and 50% (w/v) of a choline salt of a C8-C10 fatty acid. For instance, the composition may comprise between 15% (w/v) and 55% (w/v), between 20% (w/v) and 50% (w/v), between 25% (w/v) and 45% (w/v), between 30% (w/v) and 35% (w/v) of a choline salt of a C8-C10 fatty acid. Advantageously, a choline salt of a C8-C10 fatty acid, or, alternatively, a mixture of a C8-C10 fatty acid and choline hydroxide, is a stable compound, or mixture, which can be easily concentrated, diluted before use, and stored. This enables the production of a more concentrated C8-C10 fatty acid choline salt composition, which can then be easily be diluted, for instance with water, to obtain a composition with a concentration of the choline salt of a C8-C10 fatty acid, which is effective to inhibit the growth of one or more phytopathogenic fungi on a plant or plant part without phytotoxic effects. The availability of a concentrated variant allows for additional benefits in production ease, transport and storage costs. It is understood that the ready-to-use antifungal compositions comprising a choline salt of a C8-C10 fatty acid according to the invention comprise an active, but non-phytotoxic amount of a choline salt of a C8-C10 fatty acid. "Active, but non-phytotoxic amount" shall mean an amount of a choline salt of a C8-C10 fatty acid, which is sufficient to control or to kill the undesirable fungi, which amount at the same time does not exhibit noteworthy symptoms of phytotoxicity. These application rates generally may be varied in a broader range, which rate depends on several factors, e.g. undesirable microorganisms, the plant or crop, the climatic conditions and the ingredients of the composition according to the invention. In particular embodiments, said choline salt of a C8-C10 fatty acid is choline caprylate, choline pelargonate or choline caprate. In more particular embodiments, said choline salt of a C8-C10 fatty acid is choline pelargonate.

In particular embodiments, the antifungal composition as described herein further comprises additional additives, such as at least one auxiliary agent and/or inert agent. Such auxiliary agents or inerts include, but are not limited to, solvents, carriers, surfactants, a stabilizer, antifreeze agents, thickeners, buffering agents, foaming or antifoaming agents, antioxidants, preservatives and colorants. Suitable auxiliary agents and inerts are known in the art and are commercially available. In general, the active compound (i.e. a choline salt of a C8-C10 fatty acid, in particular choline caprylate, choline pelargonate or choline caprate, more particularly choline pelargonate) can be combined with any solid or liquid additive customarily used for formulation purposes. A carrier is to be understood as meaning a natural or synthetic, organic or inorganic substance which is mixed or combined with the active compounds for better applicability, in particular for application to plants or plant parts. The carrier, which may be solid or liquid, is generally inert and should be suitable for use in agriculture or horticulture. For instance, liquid carriers may include water, organic solvents, and mineral oils and vegetable oils. Suitable liquefied gaseous extenders or carriers are liquids which are gaseous at ambient temperature and under atmospheric pressure, for example aerosol propellants, such as butane, propane, nitrogen and carbon dioxide. Suitable surfactants are emulsifiers, dispersants or wetting agents having ionic or nonionic properties, or mixtures of these surfactants. It is possible to use colorants such as inorganic pigments, for example iron oxide, titanium oxide, Prussian blue, and organic dyes, such as alizarin dyes, azo dyes and metal phthalocyanine dyes, and trace nutrients, such as salts of iron, manganese, boron, copper, cobalt, molybdenum and zinc. Stabilizers, such as low-temperature stabilizers, preservatives, antioxidants, light stabilizers or other agents which improve chemical and/or physical stability may also be present. The composition may further comprise other crop protection agents and/or pesticidal agents.

Examples of typical formulations or compositions comprising a choline salt of a C8-C10 fatty acid, in particular comprising choline caprylate, choline pelargonate or choline caprate, more particularly choline pelargonate, include water-soluble liquids (SL), emulsifiable concentrates (EC), emulsions in water (EW), suspension concentrates (SC, SE, FS, OD), water-dispersible granules (WG), granules (GR) and capsule concentrates (CS), as known to the skilled person.

The present invention further provides for the use of a composition or a formulation comprising a choline salt of a C8-C10 fatty acid according to the present invention as a fungicide. The present invention thus provides for the use of said composition for reducing overall damage of plants and plant parts as well as losses in harvested fruits or vegetables caused by phytopathogenic fungi. In particular embodiments, said composition or formulation comprises between 0.00001% (w/v) and 70% (w/v) of a choline salt of a C8-C10 fatty acid, such as between 5% (w/v) and 70% (w/v) of a choline salt of a C8-C10 fatty acid, between 6% (w/v) and 70% (w/v) of a choline salt of a C8-C10 fatty acid, between 7% (w/v) and 70% (w/v) a choline salt of a C8-C10 fatty acid, between 8% (w/v) and 70% (w/v) of a choline salt of a C8-C10 fatty acid, between 9% (w/v) and 70% (w/v) of a choline salt of a C8-C10 fatty acid, or between 10% (w/v) and 70% (w/v) of a choline salt of a C8-C10 fatty acid. In particular embodiments, said choline salt of a C8-C10 fatty acid is choline caprylate, choline pelargonate or choline caprate. In more particular embodiments, said choline salt of a C8-C10 fatty acid is choline pelargonate. In particular embodiments, said composition or formulation comprises between 10% (w/v) and 60% (w/v) of a choline salt of a C8-C10 fatty acid, preferably between 10% (w/v) and 50% (w/v) of a choline salt of a C8-C10 fatty acid, more preferably between 25% (w/v) and 50% (w/v) of a choline salt of a C8-C10 fatty acid. For instance, the composition may comprise between 15% (w/v) and 55% (w/v), between 20% (w/v) and 50% (w/v), between 25% (w/v) and 45% (w/v), between 30% (w/v) and 35% (w/v) of a choline salt of a C8-C10 fatty acid. For instance, the composition may comprise between 30% (w/v) and 50% (w/v) of a choline salt of a C8-C10 fatty acid. In particular embodiments, said choline salt of a C8-C10 fatty acid is choline caprylate, choline pelargonate or choline caprate. In more particular embodiments, said choline salt of a C8-C10 fatty acid is choline pelargonate.

In other embodiments, said composition or formulation comprises between 0.00001% (w/v) and 5% (w/v) of a choline salt of a C8-C10 fatty acid, preferably between 0.02% (w/v) and 2.5% (w/v) of a choline salt of a C8-C10 fatty acid, more preferably between 0.05% (w/v) and 2% (w/v) of a choline salt of a C8-C10 fatty acid. In particular embodiments, said choline salt of a C8-C10 fatty acid is choline caprylate, choline pelargonate or choline caprate. In more particular embodiments, said choline salt of a C8-010 fatty acid is choline pelargonate.

In certain embodiments, the composition or formulation further comprises at least one additive and/or auxiliary agent, such as a solvent, a carrier, a surfactant, an antifreeze agent or another stabilizing agent, a thickener, a buffering agent, a foaming or an antifoaming agent, an antioxidant, a preservative or a colorant.

The present invention further provides a method for alleviating, controlling, preventing and/or combating a fungal infection on a plant or plant part, the method comprising applying a composition comprising a choline salt of a C8-C10 fatty acid according to the present invention, particularly a composition comprising choline caprylate, choline pelargonate or choline caprate, more particularly comprising choline pelargonate, to the plant, plant part, or locus of growth of the plant and/or the locus of the infection on said plant, in an amount effective to inhibit the growth and/or to increase the mortality of one or more phytopathogenic fungi on said plant or plant part.

Applying the composition comprising a choline salt of a C8-C10 fatty acid, particularly a composition comprising choline caprylate, choline pelargonate or choline caprate, more particularly comprising choline pelargonate according to the present invention, to the plants or plant parts may be carried out directly or by action on their surroundings, habitat or storage space using customary treatment methods, for example by dipping, spraying, atomizing, irrigating, evaporating, dusting, fogging, broadcasting, foaming, painting, spreading-on, watering (drenching) or drip irrigating. In particular embodiments, the method comprises spraying, sprinkling, showering, spritzing, spreading in droplets, spattering; dispersing, diffusing; and/or douching one or more plants, plant parts, or the locus of growth of the plant with a composition comprising a choline salt of a C8-C10 fatty acid, particularly a composition comprising choline caprylate, choline pelargonate or choline caprate, more particularly comprising choline pelargonate according to the present invention.

In certain embodiments, the method according to the present invention comprises applying an aqueous composition, comprising between 0.00001% (w/v) and 5% (w/v) of a choline salt of a C8-C10 fatty acid, preferably between 0.02% (w/v) and 2.5% (w/v) of a choline salt of a C8-C10 fatty acid, more preferably between 0.05% (w/v) and 2% (w/v) of a choline salt of a C8-C10 fatty acid. In particular embodiments, said choline salt of a C8-C10 fatty acid is choline caprylate, choline pelargonate or choline caprate. In more particular embodiments, said choline salt of a C8-C10 fatty acid is choline pelargonate In certain embodiments, the method according to the present invention comprises applying the antifungal composition as described herein in an amount ranging from at least 100 l/ha to at most 2000 l/ha, such as between 100 l/ha and 1000 l/ha, preferably ranging from 300 l/ha to 800 l/ha or from 400 l/ha to 700 l/ha of land; more preferably 450 l/ha to 600 l/ha of land; most preferably 500 l/ha to 550 l/ha of land.

In particular embodiments, the plant is an agricultural or horticultural crop. Non-limiting examples of such crop or plant comprise cereals, such as wheat, barley, rye or oats; vegetables, such as spinach, lettuce, asparagus, cabbages, tomatoes, potatoes, cucurbits or paprika; fruits, such as pomes, citrus fruit plants, banana, stone fruits or soft fruits; leguminous plants, such as beans, lentils, peas or soybeans; oil plants, such as rape, mustard, sunflowers, castor oil plants, cocoa beans or groundnuts; cucurbit plants; grape vines; nuts; ornamental plants; such as flowers, shrubs, broad-leaved trees or evergreens.

In certain embodiments, the plant may be a crop selected from the group consisting of maize, soybean, alfalfa, cotton, sunflower, *Brassica napus* (e.g. canola, rapeseed), *Brassica rapa, Brassica juncea* (e.g. (field) mustard), *Brassica carinata*, Arecaceae sp. (e.g. oilpalm, coconut), rice, wheat, sugar beet, sugar cane, oats, rye, barley, millet, and sorghum, triticale, flax, nuts, grapes, and various fruit and vegetables from various botanic taxa, e.g. Rosaceae sp. (e.g. pome fruits such as apples and pears; stone fruits such as apricots, cherries, almonds, plums and peaches; berry fruits such as strawberries, raspberries, red and black currant and gooseberry), Ribesioidae sp., Juglandaceae sp., Betulaceae sp., Anacardiaceae sp., Fagaceae sp., Moraceae sp., Oleaceae sp. (e.g. olive tree), Actinidaceae sp., Lauraceae sp. (e.g. avocado, cinnamon, camphor), Musaceae sp. (e.g. banana trees and plantations), Rubiaceae sp. (e.g. coffee), Theaceae sp. (e.g. tea), Sterculiceae sp., Rutaceae sp. (e.g. lemons, oranges, mandarins and grapefruit); Solanaceae sp. (e.g. tomatoes, potatoes, peppers, capsicum, aubergines, tobacco), Liliaceae sp., Compositae sp. (e.g. lettuce; artichokes; and chicory including root chicory, endive or common chicory), Umbelliferae sp. (e.g. carrots, parsley, celery and celeriac), Cucurbitaceae sp. (e.g. cucumbers including gherkins; pumpkins; watermelons; calabashes; and melons), Alliaceae sp. (e.g. leeks and onions), Cruciferae sp. (e.g. white cabbage, red cabbage, broccoli, cauliflower, Brussels sprouts, pak choi, kohlrabi, radishes, horseradish, cress and Chinese cabbage), Leguminosae sp. (e.g. peanuts, peas, lentils and beans, e.g. common beans and broad beans), Chenopodiaceae sp. (e.g. Swiss chard, fodder beet, spinach, beetroot), Linaceae sp. (e.g. hemp), Cannabeacea sp. (e.g. cannabis), Malvaceae sp. (e.g. okra, cocoa), Papaveraceae (e.g. poppy), Asparagaceae (e.g. asparagus); useful plants and ornamental plants in the garden and woods including turf, lawn, grass and *Stevia rebaudiana*; and in each case genetically modified types of these plants.

In certain embodiments, the plant may be a crop selected from maize, soybean or other beans, cotton or other fiber plants, wheat, barley, sorghum, millet, oats, rye, triticale, rice or other cereals, sugar cane, pome fruit trees, stone fruit trees, nut trees or other orchard trees, alfalfa or other leguminous crops, sugar beet, fodder beet, papaya, banana and plantains or other fruits, grapevines, oilseed rape, sunflower or other oil crops, squash cucumber, melons or other cucurbits, palm, jatropha or other fuel crops, cabbages, tomato, pepper or other vegetables, ornamentals, shrubs, poplar, eucalyptus or other trees, evergreens, grasses, coffee plants, tea plants, tobacco plants, hop plants, rubber plants, and latex plants.

In certain embodiments, the plant may be a member of the cereals, pulses, vegetables, fruits, nuts, oilseeds, or ornamental plants.

In certain embodiments, the plant is a non-transgenic or a transgenic plant.

In certain embodiments, the fungal infection is a fungal infection on an agricultural or horticultural crop by one or more phytopathogenic fungi. Phytophathogenic fungi may belong to the Ascomycetes (e.g. *Venturia, Podosphaera, Erysiphe, Monilinia, Mycosphaerella, Uncinula, Aspergillus, Magnaporhte* spp (Magnaporthaceae), *Thielaviopsis* spp. (Ceratocysidaceae)); Basidiomycetes (e.g. the genus *Hemileia, Rhizoctonia, Phakopsora, Puccinia, Ustilago, Tilletia, Armillaria*); Fungi imperfecti (e.g. *Botrytis, Helminthosporium, Rhynchosporium, Fusarium, Septoria, Cercospora, Alternaria, Pyricularia* and *Pseudocercosporella*); Oomycetes (e.g. *Phytophthora, Peronospora, Pseudoperonospora, Albugo, Bremia, Pythium, Pseudosclerospora, Hyaloperonospora, Plasmopara*). In certain embodiments, the phytopathenic fungi is selected from the group consisting of *Colletotrichum, Botrytis, Alternaria, Fusarium, Rhizoctonia, Sclerotinia, Verticillium, Pythium, Phytophtora, Puccinia*, Erysiphales (incl. powdery mildew) and Peronosporaceae (incl. downy mildew); preferably wherein the phytopathogenic fungus is *Colletotrichum coccodes, Botrytis cinerea, Alternaria solani*, or *Fusarium graminearum.*

In certain embodiments, said fungi is a pathogenic fungus selected from the group consisting of *Colletotrichum, Botrytis, Alternaria, Fusarium, Rhizoctonia, Sclerotinia, Verticillium, Pythium, Phytophtora, Puccinia*, Erysiphales (incl. powdery mildew) and Peronosporaceae (incl. downy mildew), *Thielaviopsis* spp (cancker rot, black root rot), *Magnaporthe grisea* (rice blast); *Armillaria* spp (virulent pathogens of trees), *Ustilago* spp. (smuts), *Phakospora pachyrhizi* (soybean rust), *Guignardia bidwellii* (grape black rot), *Blumeria graminis* (powdery mildew on grasses and cereals), *Mychosphaerella* spp., *Venturia* spp. (e.g. *V. inaequalis* (apple scab)), *Monilinia* spp. (brown rot of stone fruits).

The present invention further provides for a method for producing an antifungal composition comprising a choline salt of a C8-C10 fatty acid, particularly comprising choline caprylate, choline pelargonate or choline caprate, more particularly comprising choline pelargonate according to the present invention, comprising mixing a C8-C10 fatty acid, particularly capric acid, pelargonic acid or capric acid, more particularly pelargonic acid, or a solution comprising such fatty acid with choline hydroxide or a solution comprising choline hydroxide, thereby obtaining a composition comprising a choline salt of a C8-C10 fatty acid, particularly comprising choline caprylate, choline pelargonate or choline caprate, more particularly comprising choline pelargonate. In certain embodiments, the fatty acid is first mixed with water, thereby obtaining an aqueous solution of the fatty acid. In particular embodiments, the C8-C10 fatty acid, particularly capric acid, pelargonic acid or capric acid, and choline hydroxide are mixed in a ratio of 2:1 to 1:2, preferably in a ratio of 1.5:1 to 1:1.5 or in a ratio between 1.2:1 to 1:1.2, more preferably in equimolar ratios.

In certain embodiments, said method further comprises the step of mixing the active compounds with at least one further additive and/or auxiliary agent, such as a solvent, a carrier, a surfactant, an antifreeze agent or another stabilizer, a thickener, a buffering agent, a foaming or antifoaming agent, an antioxidant, a preservative or a colorants.

In certain embodiments, the method for producing a composition comprising a choline salt of a C8-C10 fatty acid, particularly comprising choline caprylate, choline pelargonate or choline caprate, more particularly comprising choline pelargonate further comprises the step of diluting the composition with a suitable solvent, preferably water, particularly prior to application. More in particular, the composition comprising a choline salt of a C8-C10 fatty acid, particularly comprising choline caprylate, choline pelargonate or choline caprate, more particularly comprising choline pelargonate may be diluted with water at a ratio of 1:2 to 1:1000, for instance at a ratio of 1:2 to 1:100000, 1:4 to 1:10000, 1:5 to 1:1000, or 1:10 to 1:500, preferably at a ratio of 1:5 to 1:250. For instance, the composition comprising a choline salt of a C8-C10 fatty acid, particularly comprising choline caprylate, choline pelargonate or choline caprate, more particularly comprising choline pelargonate may be diluted with water at a ratio of 1:10 to 1:500, 1:20 to 1:200, 1:25 to 1:100, 1:40 to 1:500, or 1:50 to 1:100.

The present application also provides aspects and embodiments as set forth in the following Statements:

1. Use of a composition comprising a choline salt of a C5-C13 fatty acid as a fungicide.
2. The use according to statement 1, wherein said composition is an aqueous composition comprising a choline salt of a C5-C13 fatty acid.
3. The use according to statement 1 or 2, wherein said composition is formulated as a spray or sprayable liquid, or as a concentrate.
4. The use according to any one of statements 1 to 3, wherein the composition comprises between 0.01% (w/v) and 70% (w/v) of a choline salt of a C5-C13 fatty acid.
5. The use according to statement 4, wherein the composition is a concentrate comprising between 5% (w/v) and 70% (w/v) of a choline salt of a C5-C13 fatty acid, preferably between 10% (w/v) and 60% (w/v) of a choline salt of a C5-C13 fatty acid.
6. The use according to statement 4, wherein the composition is a sprayable liquid comprising between 0.01% (w/v) and 5% (w/v) of a choline salt of a C5-C13 fatty acid, preferably between 0.05% (w/v) and 2% (w/v) of a choline salt of a C5-C13 fatty acid 7. The use according to any of the preceding statements, wherein the composition further comprises at least one further additive and/or auxiliary agent, such as a solvent, a carrier, a surfactant, an antifreeze agent, a thickener, a buffering agent, an antifoaming agent, an antioxidant, a preservative or a colorants.
8. The use according to statement 1, wherein the composition comprising a choline salt of a C5-C13 fatty acid is a solid or powdered composition comprising at least 70% (w/w), at least 80% (w/w) or at least 90% (w/w/) or up to 100% (w/w) of the choline salt of a C5-C13 fatty acid.
9. The use according to any of the preceding statements, wherein the choline salt of a C5-C13 fatty acid is choline caprylate, choline pelargonate and/or choline caprate, preferably wherein the choline salt of a C5-C13 fatty acid is choline pelargonate.
10. A method for preventing or controlling a fungal infection on a plant or plant part, the method comprising applying a composition comprising a choline salt of a C5-C13 fatty acid to the plant, plant part, or locus of growth of the plant.
11. The method according to statement 10, wherein the fungal infection is by one or more pathogens selected from the group consisting of *Colletotrichum, Botrytis, Alternaria, Fusarium, Rhizoctonia, Sclerotinia, Verticillium, Pythium, Phytophtora, Puccinia*, Erysiphales (incl. powdery mildew), Peronosporaceae (incl. downy mildew), *Thielaviopsis* spp., *Magnaporthe grisea, Armillaria* spp, *Ustilago* spp., *Phakospora pachyrhizi, Guignardia bidwellii, Blumeria graminis, Mycosphaerella* spp., *Venturia* spp. and *Monilinia* spp.; preferably wherein the fungus is *Colletotrichum coccodes, Botrytis cinerea, Alternaria solani*, or *Fusarium graminearum.*
12. The method according to statement 10 or 11, wherein the plant or plant part is an agricultural or horticultural crop.
13. The method according to any one of statements 10 to 12, wherein the method comprises applying a composition comprising between 0.01% (w/v) and 5% (w/v) of a choline salt of a C5-C13 fatty acid to the plant, plant part, or locus of growth of the plant.
14. The method according to any one of statements 10 to 13, wherein the composition comprising a choline salt of a C5-C13 fatty acid is sprayed on the plant, plant part, or locus of growth of the plant.
15. The method according to any of statements 10 to 14, wherein the composition comprising a choline salt of a C5-C13 fatty acid is a composition comprising choline caprylate, choline pelargonate and/or choline caprate, preferably wherein the composition comprising a choline salt of a C5-C13 fatty acid is a composition comprising choline pelargonate
16. A method for producing a composition comprising a choline salt of a C5-C13 fatty acid, preferably a composition comprising choline caprylate, choline pelargonate and/or choline caprate, more preferably a composition comprising choline pelargonate, said method comprising the steps of,
    (i) optionally, mixing a C5-C13 fatty acid, preferably caprylic acid, pelargonic acid and/or capric acid, more preferably pelargonic acid, with water, thereby obtaining a solution of a C5-C13 fatty acid, preferably a solution of caprylic acid, pelargonic acid and/or capric acid, more preferably a solution of pelargonic acid; and
    (ii) mixing a C5-C13 fatty acid, preferably caprylic acid, pelargonic acid and/or capric acid, more preferably pelargonic acid, or the solution of a C5-C13 fatty acid, preferably caprylic acid, pelargonic acid and/or capric acid, more preferably pelargonic acid, with choline hydroxide.
17. The method according to statement 16, wherein a C5-C13 fatty acid, preferably caprylic acid, pelargonic acid and/or capric acid, more preferably pelargonic acid, and choline hydroxide are mixed in a ratio of 2:1 to 1:2, preferably in a ratio of 1.5:1 to 1:1.5, more preferably in equimolar ratios.
18. The method according to statement 16 or 17, wherein the method further comprises mixing the composition with at least one of an auxiliary, a solvent, a carrier, a surfactant or an extender.
19. The method according to any one of statements 16 to 18, wherein the method comprises the step of diluting or dissolving the composition comprising a choline salt of a C5-C13 fatty acid, preferably the composition comprising choline caprylate, choline pelargonate and/or choline caprate, more preferably the composition comprising choline pelargonate, prior to application.
20. The method according to statement 17, wherein the composition is diluted at a ratio of 1:2 to 1:1000, preferably at a ratio of 1:5 to 1:250.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as follows in the spirit and broad scope of the appended claims.

The herein disclosed aspects and embodiments of the invention are further supported by the following non-limiting examples.

EXAMPLES

Example 1: Study of the Phytotoxicity of a Composition Comprising Choline Pelargonate on Lettuce Plants Objective.

The objective of this experiment was to evaluate the phytotoxicity of a mixture of pelargonic acid (also referred to as PLA) and choline hydroxide on lettuce plants in order to assess to what extent the phytotoxicity effect of pelargonic acid can be neutralized by mixing it with a choline hydroxide. In addition, a particular objective was to evaluate the potential efficacy of this choline-pelargonate salt as a fungicide without inducing any phytotoxicity on crops.

Procedure.

A neutralization reaction was made with pelargonic acid (>97%) and choline hydroxide (45%) based on the titration curve (FIG. 1). Based on the titration curve, a stock solution of choline pelargonate (29.1% PLA (>97%) and 40.4% Choline hydroxide (45%)) was made by mixing 14.55 mL pelargonic acid with 15.25 mL distilled water and afterwards the addition of 20.2 mL choline hydroxide. The choline pelargonate stock solution was diluted in distilled water to obtain a diluted choline pelargonate composition comprising about 2.5% pelargonic acid. The total concentration of choline pelargonate in the water spray solution was 37.08 g a.i./L (a.i.=active ingredient).

The next step was to assess the phytotoxicity of a composition comprising choline pelargonate on lettuce plants. Tested concentrations are given in Table 1. As a control, plants were treated with water. The plants were also treated with a diluted pelargonic acid composition, including a diluted pelargonic acid solution based on the commercial product Beloukha (Belchim Crop Protection).

TABLE 1

Tested compositions with their concentration of pelargonic acid and pH

| Tested composition | Concentration of pelargonic acid | pH |
|---|---|---|
| Control | — | 5.99 |
| Beloukha (680 g/L) | 2.5% | 3.59 |
| Pelargonic acid (>97%) | 2.5% | 3.75 |
| Choline pelargonate | 2.5% | 8.17 |

Lettuce plants were sprayed with a small hand sprayer until run-off with the respective compositions and incubated at 20° C. Each composition was tested with a setup consisting out of six plants. A visual assessment was made on lettuce plants after spraying. The effect of phytotoxicity (necrosis or discolouration) was scored by a scale from 0 to 100%, with 0% no phytotoxicity and 100% fully phytotoxicity on plants.

Results.

Phytotoxicity was already observed after one day on lettuce plants which were treated with the solution derived from pelargonic acid (>97%) and Beloukha (Table 2). Almost no phytotoxicity was observed for plants treated with the composition according to an embodiment of the invention after 7 days. The composition comprising choline pelargonate is thus safe for plants and was further tested as a fungicide.

TABLE 2

Phytotoxicity (%) evaluation on lettuce plants (n = 6)

| Tested composition | 0 DAA | 1 DAA | 2 DAA | 7 DAA |
|---|---|---|---|---|
| Control | 0.00 | 0.33 | 0.83 | 4.67 |
| Belouka | 0.00 | 56.67 | 57.50 | 69.17 |
| Pelargonic acid | 0.00 | 60.00 | 60.83 | 70.00 |
| Choline pelargonate | 0.00 | 1.33 | 1.67 | 3.50 |

DAA: day(s) after application;
control: water

Example 2: Evaluation of the Use According to an Embodiment of the Invention of a Composition Comprising Choline Pelargonate as a Fungicide Objective.

The objective of this experiment was to evaluate the efficacy of a composition comprising choline pelargonate against some selected pathogens in vitro.

Procedure.

Strains used for this trial (Table 3) were kept and refreshed on Potato Dextrose Agar (PDA) at 25° C.

TABLE 3

Pathogens used in the Example 3

| Pathogen | Crop | Country isolated |
|---|---|---|
| *Colletotrichum coccodes* | Potato | Netherlands |
| *Botrytis cinerea* | Lettuce | Belgium |
| *Alternaria solani* | Potato | Netherlands |
| *Fusarium graminearum* | Wheat | Belgium |
| *Botrytis cinerea* | Grapevine | Italy |

In a first setup, a test composition was directly added to PDA (about 20 mL/petri dish) (Table 4). Plugs of agar (diameter 8 mm) from two week-old cultures were placed at the center of the PDA plates. Each test was performed in 4 repetitions. The petri dishes were then incubated at 25° C. After 6 days of incubation, the diameter of the colonies was measured in 2 perpendicular directions. The percentage of inhibition was calculated for each tested composition and compared to the untreated PDA.

TABLE 4

Tested compositions with their active ingredients, dilution and pH

| Tested composition (% AI) | Active ingredient | Amount of the composition in 50 ml | pH of the medium |
|---|---|---|---|
| Control | — | — | 5.43 |
| Beloukha (0.25%) | 68% pelargonic acid | 1.1 ml | (n.d.) |
| Beloukha (2.50%) | 68% pelargonic acid | 11 ml | 4.66 |
| Choline pelargonate (0.36%)* | 42% choline pelargonate | 2.58 ml | (n.d.) |
| Choline pelargonate (3.6%)* | 42% choline pelargonate | 25.8 ml | 7.03 |

Control: water;
AI: active ingredient;
n.d.: not determined
*A choline pelargonate stock solution of choline pelargonate (referred to as 29.1% PLA (>97%) and 40.4% Choline hydroxide (45%) - pH 8.78) was prepared as in Example 1, by mixing 14.55 mL PLA with 15.25 mL distilled water and afterwards the addition of 20.2 mL choline hydroxide.

Results.

The results showed that, after 6 days of incubation, almost always 100% of inhibition could be observed on the mycelium growth compared to control plates in all compositions with Beloukha and choline pelargonate (Table 5) indicating a good efficacy of pelargonic acid and choline pelargonate on these pathogens in vitro at the tested concentrations. Choline pelargonate thus shows good fungicidal properties at the tested concentrations.

TABLE 5

Average mycellium diameter (mm) and % inhibition of the pathogens (italics) after 6 days of incubation at 25° C. Data are means ± stdev (n = 4)

| Tested composition (% AI) | Pathogen | | | | |
|---|---|---|---|---|---|
| | *Colletotrichum coccodes* | *Botrytis cinerea* (lettuce) | *Alternaria solani* | *Fusarium graminearum* | *Botrytis cinerea* (grapevine) |
| Control | 43.0 ± 4.2 | 76.0 ± 0.0 | 58.5 ± 2.7 | 76.0 ± 0.0 | 74.6 ± 2.8 |
| Beloukha (0.25%) | 0.0 ± 0.0 *100%* | 0.0 ± 0.0 *100%* | 0.0 ± 0.0 *100%* | 15.3 ± 11.0 *80%* | 0.0 ± 0.0 *100%* |
| Beloukha (2.50%) | 0.0 ± 0.0 *100%* | 0.0 ± 0.0 *100%* | 0.0 ± 0.0 *100%* | 0.0 ± 0.0 *100%* | 0.0 ± 0.0 *100%* |
| Choline pelargonate (0.36%) | 0.0 ± 0.0 *100%* | 0.0 ± 0.0 *100%* | 0.0 ± 0.0 *100%* | 17.6 ± 21.1 *77%* | 0.0 ± 0.0 *100%* |
| Choline pelargonate (3.6%) | 0.0 ± 0.0 *100%* | 0.0 ± 0.0 *100%* | 0.0 ± 0.0 *100%* | 0.0 ± 0.0 *100%* | 0.0 ± 0.0 *100%* |

Control: water;
AI: active ingredient
(*) as in Table 4

Example 3: Evaluation of the Use According to an Embodiment of the Invention of a Composition Comprising Choline Pelargonate as a Fungicide (In Vivo)

Objective.

The objective of this experiment was to evaluate the efficacy of a composition comprising choline pelargonate in vivo.

Procedure.

Single leaf test Powdery Mildew (*Podosphaera xanthii*). A zucchini plant was selected with a powdery mildew infection on old leaves. In addition to a leaf showing the first signs of infection of powdery mildew (leaf N−1), two leaves without infection (leaf N and N+1) were selected.

Leaf N was sprayed with a solution of 0.8% choline pelargonate in water, until just before run-off. Leaves (N+1) and (N−1) were left untreated. The fungal infection was assessed 8 days after the treatment.

Results.

After 8 days, both untreated leaves were heavily infected: about 100% and about 80% of the surface of leaf (N−1) and leaf (N+1), respectively, were covered by powdery mildew. In contrast, less than 5% of the surface of leaf N, treated with 0.8% choline pelargonate, was covered by powdery mildew.

Treatment with 0.8% choline pelargonate in water successfully controls powdery mildew in zucchini.

Example 4: Evaluation of the Use According to an Embodiment of the Invention of a Composition Comprising Choline Pelargonate as a Fungicide (Potato Leaf Discs)

Objective.

The objective of this experiment was to evaluate the efficacy of a composition comprising choline pelargonate against *Phytophthora infestans* on potatoes by means of an artificial inoculation in a leaf disc experiment.

Procedure.

*Phytophthora infestans* inoculum was prepared by placing "Bintje" leaflets on the inversed lid of an water agar petri dish (10 g agar/L) to simulate a humid chamber. Each leaflet was infected with *Phytophthora infestans* by placing two droplets of 20 μL sterile demi water that was suspended with mycelium taken with a tip from a colony plate (kept on rye agar at 18° C.). The petri dishes were incubated at 18° C. in the dark overnight and then in 16 h photoperiod (16 h light-8 h dark) in the same conditions of temperature during 5 to 7 days.

After the incubation period, the sporangia were collected in a 50 ml-falcon in 10 mL of sterile demi water. The leaf was placed on the sides of the falcon and demi water was pipetted on the leaf. Drained water was collected in the falcon tube and the falcon was gently shaken in order to release the sporangia. The sporangia concentration was counted using a hemacytometer and adjusted to $1\times10^5$ spores/mL. Before inoculation for the efficacy trial, the suspension was incubated at 4° C. during 2 h to enable the formation and the zoospores release.

For the efficacy trial, Bintje leaflets were dipped for 1 min in the respective treatments (shown in Table 6) and left to dry. After drying, leaflets were placed on the lid of an inversed water agar petri dish (10 g water agar/L). A 20 μL droplet of the zoospores suspension prepared before was inoculated on the centre of each leaflet. These petri dishes were then incubated in climate chambers at 18° C. in the dark during the first 16 h and then with 16 h photoperiod. Each treatment was tested on 5 petri dishes.

After 7 days of incubation, the lesion size was measured in two perpendicular directions. The lesion surface (S) was calculated using the equation of an ellipse: $S=\pi\times L\times I\times\%$, wherein L and I are the length of the major axis and minor axis of the ellipse, respectively.

TABLE 6

Tested compositions with their active ingredients, dose rate and concentration

| Tested composition | Active ingredient | Dose Rate (L · kg/ha)(*) | mL of product in 100 mL water |
|---|---|---|---|
| 1. Control | — | — | — |
| 2. Dithane WG | Mancozeb 75% | 2 | 0.4 |
| 3. Choline pelargonate | choline pelargonate 42% | 1 | 0.2 |

TABLE 6-continued

| Tested compositions with their active ingredients, dose rate and concentration | | | |
|---|---|---|---|
| Tested composition | Active ingredient | Dose Rate (L · kg/ha)(*) | mL of product in 100 mL water |
| 4. Choline pelargonate | choline pelargonate 42% | 10 | 2 |
| 5. Beloukha | pelargonic acid 29% | 1 | 0.2 |

Control: water;
(*)used water volume 500 L/ha

Results.

After 7 days of incubation, for all treated leaflets a good efficacy could be observed (Table 7). Leaflets treated with choline pelargonate showed almost the same efficacy as Dithane treated leaflets. Furthermore, a dose response could be observed for the choline pelargonate treated leaflets. Leaflets treated with the highest concentration of choline pelargonate showed some minor phytoxicity symptoms on the edge and stem, which were presumably promoted by wounding during sampling and handling. Beloukha treated leaves at a concentration corresponding to 1 L/ha showed phytotoxic effects on the edge and stem, in line with the known phytotoxic effects of pelargonic acid.

TABLE 7

| Lesion size of *Phytopthora infestans* on potato leaves after 7 days of incubation. Data are means ± stdev (n = 5). | | |
|---|---|---|
| Treatment | Lesion Size ($cm^2$) | Efficacy (%) (Abbott) |
| 1 (control) | 9.08 ± 3.78 | — |
| 2 (dithane WG) | 0.00 ± 0.00 | 100.0 |
| 3 (choline pelargonate) | 0.41 ± 0.57 | 84.9 |
| 4 (choline pelargonate) | 0.00 ± 0.00 | 100.0 |
| 5 Beloukha | 0.96 ± 1.33 | 64.67 |

Example 5: Evaluation of the Use According to an Embodiment of the Invention of a Composition Comprising Choline Pelargonate as a Fungicide (Grapevine Leaf Discs)

Objective.

The objective of this experiment was to evaluate the efficacy of a composition comprising choline pelargonate against *Plasmopara viticola* on by means of an artificial inoculation in a grapevine leaf disc experiment.

Procedure.

A stock solution of choline pelargonate (29.1% PLA and 40.4% Choline hydroxide, pH 8.82) was made by mixing 14.55 mL PLA with 15.25 mL distilled water and afterwards the addition of 20.2 mL of Choline hydroxide. The choline pelargonate stock solution (42.04%) was diluted in order to create a solution with a final concentration of choline pelargonate equal to 1 mL/L and 10 mL/L. The two choline pelargonate solutions, water as negative control and copper hydroxide (2 g/L) as positive control were used for this test.

For each object 4 Petri plates were prepared and each plate contains 5 grapevine leaf discs (see Table 8 below).

TABLE 8

| Overview of treatments | | | |
|---|---|---|---|
| Objects | Active Ingredient | (L, kg/ha)(*) | mL, g of product in 100 mL water |
| Untreated (negative control - water) | — | — | — |
| Copper (positive control) | Copper Hydroxide | 2 Kg/ha | 0.2 |
| choline pelargonate 42% | choline pelargonate | 1 L/ha | 0.1 |
| choline pelargonate 42% | choline pelargonate | 10 L/ha | 1 |

Control: water;
(*)used water volume 1000 L/ha

Leaf discs preparation: leaf discs (diameter 19 mm) were prepared from grapevine cuttings (variety Pinot Nero Entav 115) using the young leaves. 5 leaf discs were placed in each Petri Plate on autoclaved paper (4 layers), the paper was previously wetted by adding 8.5 mL of sterile water in each plate. The leaf discs were placed on the paper with the abaxial side upward.

Test products application and pathogen inoculation: leaf discs were treated with the test products at 11.30 A.M (i.e. a preventive application) and the leaves were allowed to dry. The products were sprayed with a small hand sprayer; 5 sprays were applied on each plate. The same day at 16.30 a suspension of *P. viticola* spores at final concentration of $2*10^5$ spore/mL was applied (5 hours after test product application) on the leaf discs. The inoculated plates were incubated overnight in the dark at 25° C. The following day, the leaf discs were dried under the laminar flow and then placed back at 25° C. The disease assessment was done 7 days after the artificial inoculation.

Results:

The assessment of the disease severity was performed 7 days after the artificial inoculation showed that about 58% of the control leaf disc area (water treatment) was affected by *P. viticola*. The positive control treatment with copper did not show any disease symptoms on the leaf discs. The control treatments confirmed that the experiment is reliable and the artificial inoculation worked properly. The discs treated with choline pelargonate 10 mL/L did not show symptoms (severity 0%) while the choline pelargonate 1 mL/L showed a very low level of sporulation equal to 5.3%. Choline pelargonate applied at 10 mL/Land 1 mL/L thus showed comparable results with the reference copper hydroxide in term of efficacy (Coprantol Hi Bio).

The test was repeated a second and a third time (data not shown) and the results were confirmed: TMAP showed an efficacy against *P. viticola* comparable with the reference copper.

Example 6: Evaluation of the Efficacy of a Composition According to an Embodiment Comprising Choline Pelargonate as a Fungicide Against *Phytophthora infestans* in Potato Goal of the Trial:

The goal of this test was to evaluate the efficacy of a composition illustrating the invention (referred to as "BPA 056") against *Phytophthora infestans*. To achieve this goal, several concentrations of the composition were tested. The test was done by inoculating a mixture of the composition and spores on potato leaf discs and evaluate the efficacy on the disease severity.

Origin of the Research:

Screening and development of new solutions against Late Blight.

Materials and Methods

The *Phytophthora infestans* strain 1813E11 was used in this test. This strain comes from Belgium, isolated from infected leaf in 2018, and genotyped as EU36_A2 by the Wageningen Institute. The inoculum was kept on rye agar medium and refreshed by infecting potato leaves, variety Bintje, in order to produce new inoculum. The spores collected on the fresh lesions of the leaves were used in this trial.

Potato plants of the cultivar Bintje were grown for 3-4 weeks in a greenhouse in natural conditions. Leaves from the same physiological stage were used for this test.

The compositions and concentrations are presented in Table 9 below. Fluazinam is the reference product in this trial.

TABLE 9

Tested compositions and concentrations in a trial to test the efficacy of different compositions against *Phytophthora infestans* in potato

| Product | Active ingredient(s) | g ai/L in product | mL/L tested | ppm (ai) tested |
|---|---|---|---|---|
| Untreated | Water | / | / | / |
| Shirlan | Fluazinam | 500 | 0.2 | 100 |
| BPA 056 | Choline pelargonate | 400 | 10 | 4000 |
| BPA 056 | Choline pelargonate | 400 | 1 | 400 |

TABLE 9-continued

Tested compositions and concentrations in a trial to test the efficacy of different compositions against *Phytophthora infestans* in potato

| Product | Active ingredient(s) | g ai/L in product | mL/L tested | ppm (ai) tested |
|---|---|---|---|---|
| BPA 056 | Choline pelargonate | 400 | 0.1 | 40 |
| BPA 056 | Choline pelargonate | 400 | 0.01 | 4 |

Trial Conduct:

This trial was done on discs of potato leaves. All the treatments were tested on 5 leaf discs each.

The spores solution was prepared by collecting fresh sporangia from infected leaves (about 5 to 7 days after inoculation) in demineralized water. The spores concentration was adjusted to 125 000 spores/mL and incubated at 4° C. for 2 hours to induce the zoospores differentiation and release.

The product solutions were prepared by making a 2× concentration solutions in demineralized water.

The spores solution was mixed with the product solution (1:1 v:v)

Each leaf disc was inoculated with 3×10 µL of the spores-product mixture.

The leaf discs were incubated at 18° C. and 100% RH in the dark for 24 h and then at a 16 h photoperiod regime.

The test was done once.

Assessment

Six days after inoculation, the percentage of disease severity (surface covered with sporulating *Phytophthora*) was visually assessed on each leaf disc.

Results

The results in percentage of disease severity are presented in Table 10 below.

The disease severity reached 100% on the 5 leaf discs of the untreated control.

The reference, fluazinam, showed 100% of efficacy at 100 ppm.

BCP 056 reached the maximum level of efficacy at the highest dose, 4000 ppm, and then decreased to 80% of efficacy for the 400 ppm, 40 ppm and 4 ppm dose rates. No dosis effect was observed between the three last dilutions (400 ppm, 40 ppm and 4 ppm).

The level of efficacy at 4 ppm was very satisfactory in this trial.

TABLE 10

Disease severity (%) on potato leaf discs

| Leaf disc | Untreated | Fluazinam 100 ppm | BPA 056 4000 ppm | BPA 056 400 ppm | BPA 056 40 ppm | BPA 056 4 ppm |
|---|---|---|---|---|---|---|
| a | 100 | 0 | 0 | 0 | 0 | 100 |
| b | 100 | 0 | 0 | 0 | 100 | 0 |
| c | 100 | 0 | 0 | 0 | 0 | 0 |
| d | 100 | 0 | 0 | 0 | 0 | 0 |
| e | 100 | 0 | 0 | 100 | 0 | 0 |
| Mean | 100 | 0 | 0 | 20 | 20 | 20 |

Conclusion

A composition illustrating the invention (i.e. BPA 056) showed an interesting level of efficacy at a concentration of 4 ppm in controlling *Phytophthora infestans* on leaf discs.

Example 7: Evaluation of the Efficacy of Compositions Comprising Choline Salts of C8-, C9- and C10-Fatty Acids According to Embodiments of the Invention Against Pathogens In Vitro Objective:

The objective of this experiment was to evaluate the efficacy of different choline salts derived from C8-, C9- and 010-fatty acids against some selected pathogens in vitro. The tested choline salts were choline octanoate (TMAO), choline pelargonate (TMAP) and choline decanoate (TMAD).

Procedure

Strains used for this trial were kept and refreshed on Potato Dextrose Agar (PDA) at 25° C.

To begin, a quantity of test product was directly added in a certain volume of PDA (about 20 mL/petri dish) (Table 11). Plugs of agar (diameter 10 mm) from one week-old cultures were placed at the centre of the PDA plates. Each object was performed in 4 repetitions. The petri dishes were then incubated at 25° C. in the dark. After 3 and 6 days of incubation, the diameter of the colonies was measured in 2 perpendicular directions. The percentage of inhibition was calculated for each product/concentration compare to the untreated.

TABLE 11

Tested products and concentrations in a trial to test the efficacy of choline salts of C8-, C9- and C10-fatty acids

| Product | Batch number | Active ingredient | Form type | Concentration (mL product/L PDA medium) | g a.i./L PDA | % (w/v) a.i. tested* | pH in PDA |
|---|---|---|---|---|---|---|---|
| Control | / | / | / | / | / | / | 5.27 |
| TMAO | 20190731-1 | Choline octanoate 43% | SL | 0.98 | 0.42 | 0.042 | 5.43 |
| TMAO | 20190731-1 | Choline octanoate 43% | SL | 9.77 | 4.2 | 0.42 | 5.75 |
| TMAP | 20190402 | Choline pelargonate 42% | SL | 1 | 0.42 | 0.042 | 5.41 |
| TMAP | 20190402 | Choline pelargonate 42% | SL | 10 | 4.2 | 0.42 | 5.73 |
| TMAD | 20190731-2 | Choline decanoate 34% | SL | 1.24 | 0.42 | 0.042 | 5.42 |
| TMAD | 20190731-2 | Choline decanoate 34% | SL | 12.35 | 4.2 | 0.42 | 6.13 |

SL: sprayable liquid;
*1% (w/v) a.i. tested = 1 g a.i./100 ml

Results

After 3 days of incubation, results showed 100% of inhibition on the mycelium growth for all pathogens compared to control plates in all choline salts with the highest concentration, 0.42% (v/v) (Table 12), indicating a good efficacy of choline salts (C8-C9-C10) on these pathogens in vitro. Furthermore, no differences were observed between the different choline salts and results were always comparable between the tested concentrations.

TABLE 12

Average mycelium diameter (mm) and % efficacy (italics) compared to control (Abbott) after 3 days of incubation at 25° C. Data are means ± stdev (n = 4)

| Treatment (a.i. %) | *Rhizoctonia solani* | *Pythium ultimum* | *Sclerotinia minor* | *Botrytis cinerea* | *Sclerotinia sclerotiorum* |
|---|---|---|---|---|---|
| Control | 52.4 ± 6.5 | 67.6 ± 5.0 | 68.6 ± 8.8 | 42.7 ± 5.8 | 72.5 ± 0.6 |
| TMAO | 18.9 ± 3.8 | 0.0 ± 0.0 | 2.5 ± 2.9 | 12.1 ± 11.0 | 1.3 ± 0.3 |
| 0.042% | *64%* | *100%* | *96%* | *72%* | *98%* |
| TMAO | 0.0 ± 0.0 | 0.0 ± 0.0 | 0.0 ± 0.0 | 0.0 ± 0.0 | 0.0 ± 0.0 |
| 0.42% | *100%* | *100%* | *100%* | *100%* | *100%* |
| TMAP | 17.1 ± 1.9 | 0.0 ± 0.0 | 2.8 ± 4.3 | 0.9 ± 1.8 | 1.4 ± 0.5 |
| 0.042% | *67%* | *100%* | *96%* | *98%* | *98%* |
| TMAP | 0.3 ± 0.5 | 0.0 ± 0.0 | 0.8 ± 0.9 | 0.0 ± 0.0 | 0.0 ± 0.0 |
| 0.42% | *100%* | *100%* | *99%* | *100%* | *100%* |

TABLE 12-continued

Average mycelium diameter (mm) and % efficacy (italics) compared to control (Abbott) after 3 days of incubation at 25° C. Data are means ± stdev (n = 4)

| Treatment (a.i. %) | *Rhizoctonia solani* | *Pythium ultimum* | *Sclerotinia minor* | *Botrytis cinerea* | *Sclerotinia sclerotiorum* |
|---|---|---|---|---|---|
| TMAD | 27.3 ± 6.9 | 0.0 ± 0.0 | 1.5 ± 1.8 | 7.0 ± 10.7 | 2.1 ± 1.7 |
| 0.042% | *48%* | *100%* | *98%* | *84%* | *97%* |
| TMAD | 0.4 ± 0.8 | 0.0 ± 0.0 | 0.5 ± 0.6 | 2.0 ± 4.0 | 0.0 ± 0.0 |
| 0.42% | *99%* | *100%* | *99%* | *95%* | *100%* |

To conclude, all tested choline salts, namely choline octanoate (TMAO), choline pelargonate (TMAP) and choline decanoate (TMAD), showed good fungicidal properties at tested dose rates. The C8-, C9- and 010-fatty acid choline salts can be used as a fungicide on plants with strongly reduced or even without phytotoxic effects (see Example 8), despite the commonly known use of C8-, C9- and 010-fatty acids, such as caprylic acid, pelargonic acid and capric acid, as a herbicide.

Example 8: Trial on Apple Trees to Test the Efficacy of a Composition According to an Embodiment of the Invention Comprising Choline Pelargonate Against Powdery Mildew on Apple Objective:

Investigate the efficacy of TMAP against powdery mildew on apple.

Plant Material:

During the third week of March 2017, 60 branched apple trees (rootstock M9—clone Golden B) of 2 years were transplanted from a local nursery into pots (pot: 12 Liters). The 60 potted apple plants were maintained outside the greenhouse in S. Michele all'Adige (Trento). Plants were maintained divided in 3 blocks. Each block was composed of 20 plants arranged in two rows (See scheme 1). Plants were watered through a drip irrigation system once or twice a week according to the weather conditions. The insecticidal treatments were applied uniformly on all the experimental plants. Two of the three objects were treated against powdery mildew in accordance with the foreseen spray scheme: Chemical treatments, TMAP alone, untreated. One object was maintained Untreated as reference. For the "Chemical" object, different active ingredients were used alone or in combination (Table 13).

TABLE 13

Tested products and concentrations in a trial to test the efficacy of choline pelargonate against powdery mildew on apple

| Treatment | Active ingredient | Dose rate |
|---|---|---|
| Untreated | / | / |
| TMAP alone | TMAP | 10 mL/L |
| Chemical | Polysulfur | 12 mL/L |
| | Scudex (Penconazole) | 0.35 mL/L |
| | Cidely (Cyflufenamid) | 0.3 mL/L |
| | Nimrod 250 EW (Bupirimate) | 0.5 mL/L |

The treatments were performed at the same time, and timings of spray were done weekly and according to the weather conditions. The applications were done with a pressurized hand sprayer (water volume 1.5-2 L per object).

Treatments/assessment were done during the season as reported in table 14 below.

TABLE 14

Overview of treatments and assesment during the trial to test the efficacy of choline pelargonate against powdery mildew on apple

| Date | Object | Treatment | Dose rate | $H_2O$ vol. |
|---|---|---|---|---|
| Day 0 | Untreated | — | — | — |
| | Chemical | Polysulfur | 12 mL/L | 1.5 L |
| | TMAP solo | Polysulfur | 12 mL/L | 1.5 L |
| Day 9 | Untreated | — | — | — |
| | Chemical | Polysulfur | 12 mL/L | 1.5 L |
| | TMAP solo | Polysulfur | 12 mL/L | 1.5 L |
| Day 15 | Untreated | — | — | — |
| | Chemical | Nimrod 250EW | 0.5 mL/L | 2 L |
| | TMAP solo | TMAP | 10 mL/L | 2 L |
| Day 23 | Untreated | — | — | — |
| | Chemical | Cidely | 0.3 mL/L | 2 L |
| | TMAP solo | TMAP | 10 mL/L | 2 L |
| Day 30 | Untreated | — | — | — |
| | Chemical | Nimrod 250EW + Delan 70WG | 0.5 mL/L + 0.5 g/L | 2 L |
| | TMAP solo | TMAP + Delan 70WG | 10 mL/L + 0.5 g/L | 2 L |
| Day 37 | Untreated | — | — | — |
| | Chemical | Scudex | 0.5 mL/L | 2 L |
| | TMAP solo | TMAP | 10 mL/L | 2 L |

TABLE 14-continued

Overview of treatments and assesment during the trial to test the efficacy of choline pelargonate against powdery mildew on apple

| Date | Object | Treatment | Dose rate | $H_2O$ vol. |
|---|---|---|---|---|
| Day 38 | Untreated | Epik + Poltiglia Dispers | 1.3 g/L + 1 g/L | 2 L |
| | Chemical | Epik + Poltiglia Dispers | 1.3 g/L + 1 g/L | 2 L |
| | TMAP solo | Epik + Poltiglia Dispers | 1.3 g/L + 1 g/L | 2 L |
| | Untreated | — | — | — |
| Day 44 | Chemical | Cidely | 0.3 mL/L | 2 L |
| | TMAP solo | TMAP | 10 mL/L | 2 L |
| Day 51 | Untreated | — | — | — |
| | Chemical | Scudex | 0.35 mL/L | 2 L |
| | TMAP solo | TMAP | 10 mL/L | 2 L |
| Day 52 | Untreated | Fertilization K-P-N | | |
| | Chemical | Fertilization K-P-N | | |
| | TMAP solo | Fertilization K-P-N | | |
| Day 57 | Untreated | — | — | — |
| | Chemical | Scudex | 0.35 mL/L | 2 L |
| | TMAP solo | TMAP | 10 mL/L | 2 L |
| Day 58 | Untreated | Movento + Delan | 3 mL/L + 0.5 g/L | 2 L |
| | Chemical | Movento + Delan | 3 mL/L + 0.5 g/L | 2 L |
| | TMAP solo | Movento + Delan | 3 mL/L + 0.5 g/L | 2 L |
| Day 65 | Untreated | — | — | — |
| | Chemical | Nimrod 250EW | 0.4 mL/L | 2 L |
| | TMAP solo | TMAP | 10 mL/L | 2 L |
| Day 71 | Untreated | — | — | — |
| | Chemical | Cidely | 0.3 mL/L | 2 L |
| | TMAP solo | TMAP | 10 mL/L | 2 L |
| Day 78 | Untreated | — | — | — |
| | Chemical | Scudex | 0.35 mL/L | 2 L |
| | TMAP solo | TMAP | 10 mL/L | 2 L |
| Powdery mildew assessment on Day 85 - "severity" | | | | |
| Day 86 | Untreated | — | — | — |
| | Chemical | Scudex | 0.35 mL/L | 2 L |
| | TMAP solo | TMAP | 10 mL/L | 2 L |

Assessment

Powdery mildew: 5 shoots per each plant were randomly selected and labeled for the assessments. The assessment on powdery mildew was done on day 85, ten leaves of each shoot were singularly evaluated for the presence of symptoms, 5 marked shoots per plant were assessed. For each object we have 20 apple trees.

Statistical Analysis

Data of powdery mildew incidence were analyzed using the Statistica 13.1 software. Because the data did not respect the features to apply parametric statistics we proceeded with non-parametric statistical analysis. A Kruskal-Wallis test was used to demonstrate significant differences between treatments (p s 0.05).

Results

The presence of powdery mildew symptoms were evaluated on 10 leaves present on each of the 5 marked branches. In this way, the disease incidence (i.e. percentage of infected leaves) on 50 leaves per plant (50×20=1000 leaves per object) was evaluated. The assessment showed the best results were obtained by the chemical strategy (8.7% incidence). The TMAP objects showed a statistically relevant reduction of symptoms (25.5% incidence) in comparison to the untreated (55.3% incidence).

No symptoms of phytotoxicity on the plants were observed.

The efficacy of Chemical object reached 84.2%, while TMAP reached an efficacy of 53.8% (on day 85).

CONCLUSIONS

A high level of powdery mildew disease pressure on apple leaves was obtained. The best result was obtained by the chemical strategy with levels of efficacy over 80%. TMAP alone showed medium level of efficacy around 54%. Importantly, the repeated applications of TMAP during the season seemed to be safe for the crop, as no symptoms of phytotoxicity on the plants were observed. The applications of TMAP along the season (April-July) for the protection of powdery mildew of apple guaranteed an appropriate protection.

What is claimed is:

1. A method for reducing or controlling a fungal infection on a plant or plant part, the method comprising applying a composition comprising between 0.1% (w/v) and 1% (w/v) of choline pelargonate to the plant, plant part, or locus of growth of the plant.

2. The method according to claim 1, wherein the fungal infection is by one or more pathogens selected from the group consisting of *Colletotrichum, Botrytis, Alternaria, Fusarium, Rhizoctonia, Sclerotinia, Verticillium, Pythium, Phytophtora, Puccinia*, Erysiphales, Peronosporaceae, *Thielaviopsis* spp., *Magnaporthe grisea, Armillaria* spp, *Ustilago* spp., *Phakospora pachyrhizi, Guignardia bidwellii, Blumeria graminis, Mycosphaerella* spp., *Venturia* spp. and *Monilinia* spp.; preferably wherein the fungus is *Colletotrichum coccodes, Botrytis cinerea, Alternaria solani*, and *Fusarium graminearum*.

3. The method according to claim 1, wherein the plant or plant part is an agricultural or horticultural crop.

4. The method according to claim 1, wherein the composition comprising choline pelargonate is sprayed on the plant, plant part, or locus of growth of the plant.

5. The method according to claim 1, wherein the fungal infection is powdery mildew.

6. The method according to claim 1, wherein the fungal infection is downy mildew.

7. The method according to claim 2, wherein the fungal infection is by one or more pathogens selected from the group consisting of *Colletotrichum coccodes, Botrytis cinerea, Alternaria solani*, and *Fusarium graminearum.*

* * * * *